United States Patent
Chen (10) Patent No.: US 9,946,064 B1
(45) Date of Patent: Apr. 17, 2018

(54) ANTI-GHOSTING REFLECTION DEVICE AND A DISPLAY SYSTEM WITH THE SAME

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 15/411,791

(22) Filed: Jan. 20, 2017

(51) Int. Cl.
*G02B 27/00* (2006.01)
*G02B 5/30* (2006.01)
*G02B 27/01* (2006.01)

(52) U.S. Cl.
CPC ....... *G02B 27/0018* (2013.01); *G02B 5/3083* (2013.01); *G02B 27/0101* (2013.01); *G02B 2027/0118* (2013.01)

(58) Field of Classification Search
CPC .............. G02B 27/0018; G02B 5/3083; G02B 27/0101; G02B 2027/0118; B60R 1/00; B60R 1/001; B32B 17/1055
USPC ..................................... 359/489.07; 349/119
See application file for complete search history.

(56) References Cited

U.S. PATENT DOCUMENTS

| 5,212,471 | A | * | 5/1993 | McDonald | G02B 27/0018 345/7 |
| 6,853,491 | B1 | * | 2/2005 | Ruhle | G02B 5/3016 349/11 |
| 2011/0293857 | A1 | * | 12/2011 | Fukatani | B32B 17/10458 428/1.33 |
| 2017/0184844 | A1 | * | 6/2017 | Matsushita | G02B 27/142 |
| 2017/0199380 | A1 | * | 7/2017 | Larson | G02B 27/0101 |
| 2017/0219818 | A1 | * | 8/2017 | Fang | G02B 26/008 |
| 2017/0235030 | A1 | * | 8/2017 | Tanaka | G02B 5/0816 349/11 |
| 2017/0242247 | A1 | * | 8/2017 | Tso | G02B 27/0101 |
| 2017/0285339 | A1 | * | 10/2017 | Spangler | B32B 37/06 |
| 2017/0313032 | A1 | * | 11/2017 | Arndt | B32B 17/10036 |

(Continued)

FOREIGN PATENT DOCUMENTS

| CN | 203688913 U | * | 7/2014 | ............. G02B 27/01 |
| CN | 204740400 U | * | 11/2015 | ............. G02B 27/01 |
| TW | 159122 B | | 6/1991 | |

(Continued)

OTHER PUBLICATIONS

Machine translation of CN2014225209U from https://worldwide.espacenet.com/publicationDetails/biblio?CC=CN&NR=20368891U, downloaded Nov. 22, 2017.*

(Continued)

*Primary Examiner* — Frank Font
(74) *Attorney, Agent, or Firm* — Wang Law Firm, Inc.

(57) ABSTRACT

An anti-ghosting reflection device includes: a reflection sandwich layer with a first surface and a second surface which are used as reflection surfaces; a first half-wave plate disposed on the first surface of the reflection sandwich layer; and a second half-wave plate disposed beneath the second surface. An anti-ghosting display system is capable of solving the problem of low reflection at the Brewster's angle, the invisibility of the polarized sunglasses, raindrops-caused image distortion by the use of the reflection sandwich layer disposed in the two half-wave plates in combination with an imaging device which can generate a polarization imaging light P.

10 Claims, 10 Drawing Sheets

(56) References Cited

U.S. PATENT DOCUMENTS

2017/0315352 A1* 11/2017 Hardy ................ G02B 27/0101

FOREIGN PATENT DOCUMENTS

| TW | 393582 | B | 6/2000 |
| TW | 1266075 | B | 11/2006 |
| TW | 1274683 | B | 3/2007 |
| TW | 1278651 | B | 4/2007 |
| TW | M355841 | U | 5/2009 |
| TW | M375629 | U1 | 3/2010 |
| TW | 201022734 | A | 6/2010 |
| TW | M437281 | U1 | 9/2012 |
| TW | 1422860 | B | 1/2014 |

OTHER PUBLICATIONS

Machine translation of CN204740400U from https://worldwide.espacenetcom/publicationDetails/biblio?II=0&ND=3&adjacent=true&NR=204740400U, downloaded Nov. 22, 2017.*

* cited by examiner

ANTI-GHOSTING REFLECTION DEVICE AND A DISPLAY SYSTEM WITH THE SAME

BACKGROUND

Field of the Invention

The present invention relates to an anti-ghosting equipment, and more particularly to an anti-ghosting reflection device capable of solving the problem of low reflection at the Brewster's angle, the invisibility of the polarized sunglasses, raindrops-caused image distortion by the use of the reflection sandwich layer in the two half-wave plates in combination with the polarization imaging light.

Related Prior Art

The technique of the existing HUD (head up display) used on vehicles is less complicated than the HUD used on the plane. HUD is an optical system which comprises a projector and a plane combiner. The projector includes a image light source, a projection lens, and others optical elements. The image light source of the projector consists of LCD (liquid crystal display) or CRT (cathode ray tube). Light is generated from the image light source and projected onto the plane combiner (or specially made transparent screen) by the projector, and finally the plane combiner displays text or image.

Figure 1:
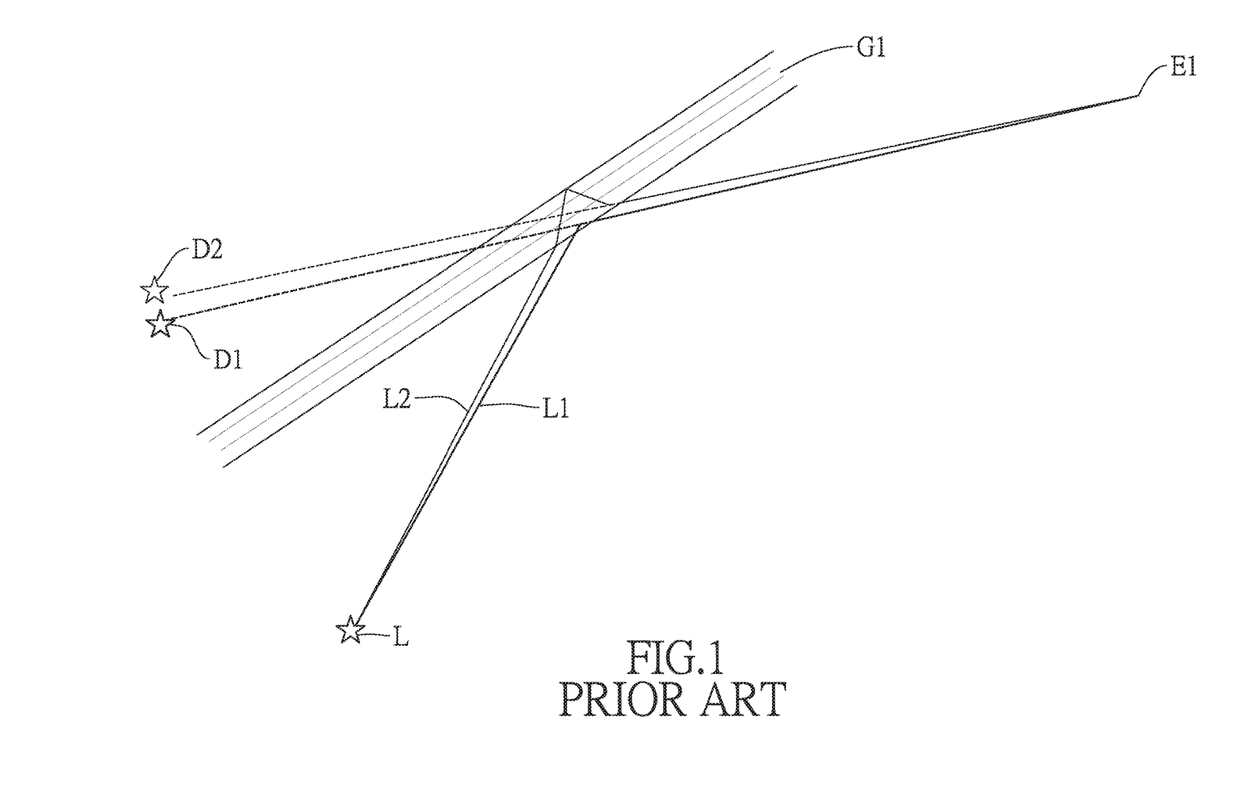
FIG. 1 illustrates the ghosting of a conventional windshield of a vehicle.

FIG. 1 shows a windshield display panel of a vehicle, wherein a light source L will produce two different reflection paths L1 and L2, when projecting light onto two sides of an equal thickness glass G1, and will produce a virtual image D1, D2 on each side of the glass, which will cause ghosting to the user's eyes E1.

Figure 2:
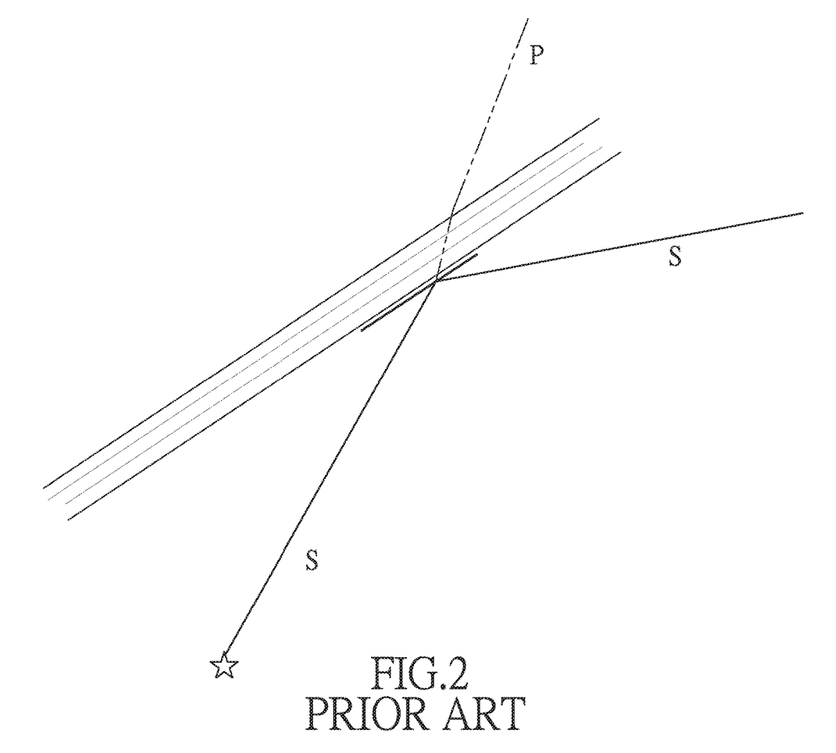
FIG. 2 is an illustrative view showing the use of half-wave plate in combination of the polarization imaging light S.

FIG. 2 shows the use of the half-wave plate and the polarization imaging light S to solve the problem of ghosting, the polarization imaging light P has almost zero reflectivity to the windshield because of Brewster's angle. However, the polarization imaging light is invisible to a pair of polarized sunglasses.

Figure 3:
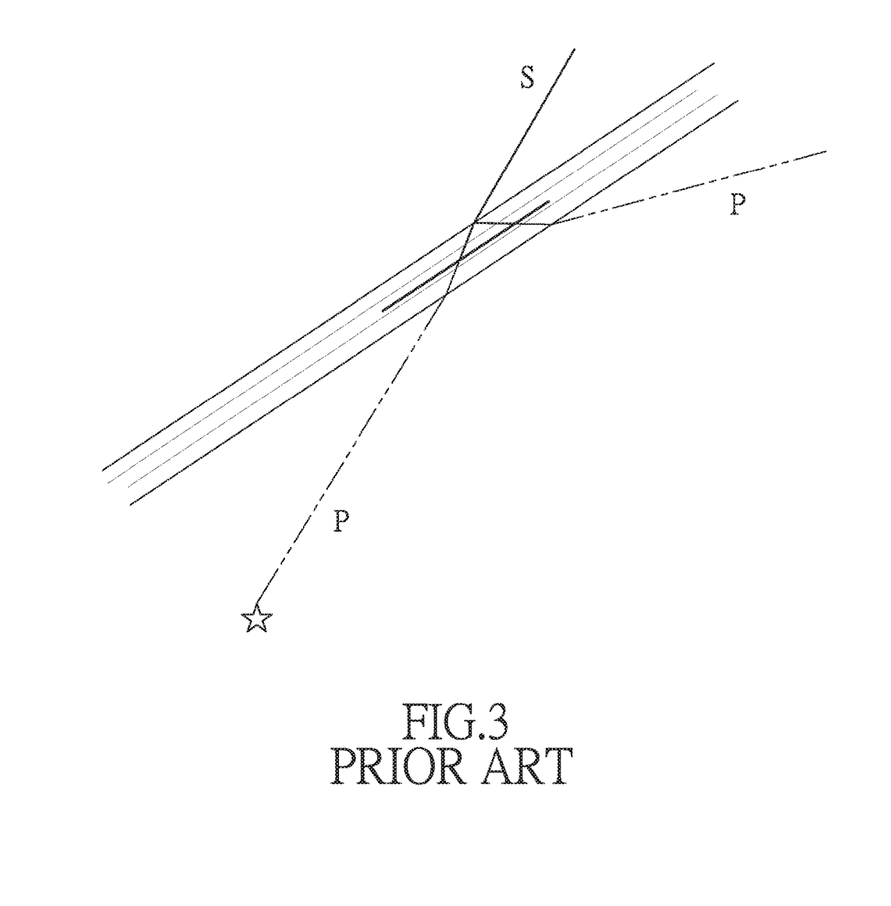
FIG. 3 is an illustrative view showing the use of half-wave plate in combination of the polarization imaging light P.
Figure 4:
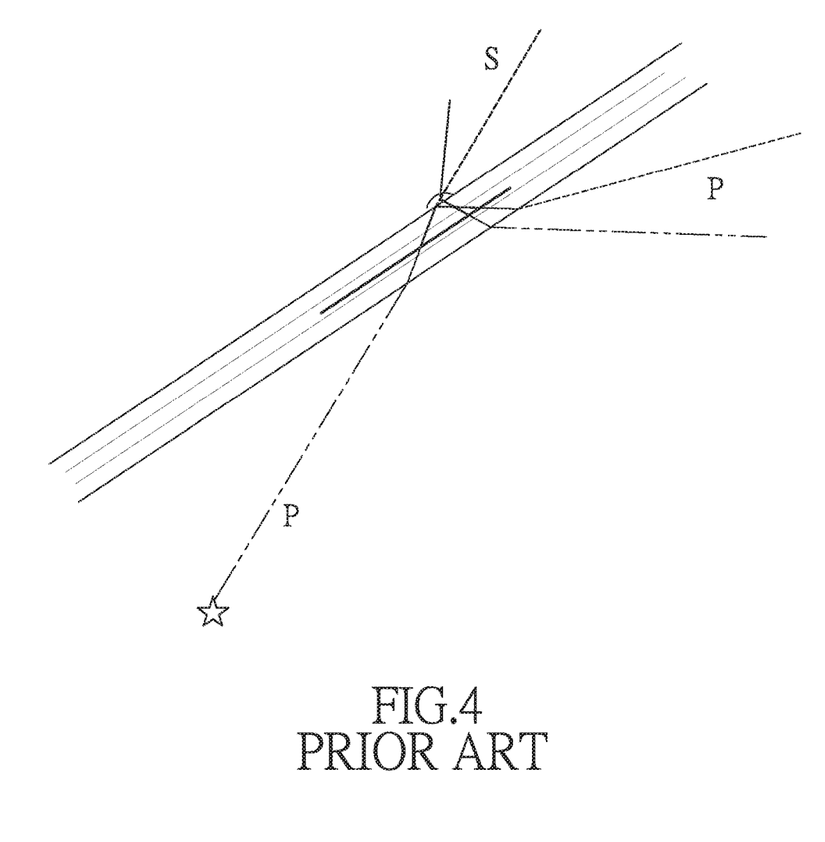
FIG. 4 shows the image distortion caused by raindrops.

FIG. 3 shows the use of the half-wave plate and the polarization imaging light P to solve the problem of low reflection at the Brewster's angle and the invisibility of the polarized sunglasses. As shown in FIG. 4, since the reflection layer is at the outmost layer of the windshield, it will be affected by raindrops, consequently, image distortion will be caused in rainy conditions.

For the existing vehicle HUD, reference can be made to the Taiwan Patent No. I422860、I59122、393582、I266075、I274683、I278651、M355841、M437281、M375629、201022734.

The present invention has arisen to mitigate and/or obviate the afore-described disadvantages.

SUMMARY

One objective of the present invention is to provide an anti-ghosting reflection device capable of solving the problem of low reflection at the Brewster's angle, the invisibility of the polarized sunglasses, raindrops-caused image distortion by the use of the reflection sandwich layer in the two half-wave plates in combination with the polarization imaging light.

Therefore, an anti-ghosting reflection device in accordance with the present invention comprises: a reflection sandwich layer with a first surface and a second surface which are used as reflection surfaces; a first half-wave plate disposed on the first surface of the reflection sandwich layer; and a second half-wave plate disposed beneath the second surface.

An anti-ghosting display system in accordance with the present invention comprises: an anti-ghosting reflection device which comprises: a reflection sandwich layer with a first surface and a second surface which are used as reflection surfaces; a first half-wave plate disposed on the first surface of the reflection sandwich layer; a second half-wave plate disposed beneath the second surface; wherein the anti-ghosting reflection device is disposed between a first glass and a second glass, the first glass and the second glass are a windshield of a vehicle; and an imaging device produces a polarization imaging light P, when passing through a juncture of the second half-wave plate and the second surface of the reflection sandwich layer, the polarization imaging light P will be converted into the polarization imaging light S, a reflection of the polarization imaging light S by the second surface is a polarization imaging light S1, when passing through a juncture of the second half-wave plate and the second glass, the polarization imaging light S1 is converted into a polarization imaging light P1 which passes through the second glass and toward the direction of a user's eyes, a reflection of the polarization imaging light S by the first surface of the reflection sandwich layer is a polarization imaging light S2, when passing through the juncture of the second half-wave plate and the second glass, the polarization imaging light S2 will be converted into a polarization imaging light P2 which passes through the second glass and toward the direction of the user's eyes.

The reflection sandwich layer is very thin (approximately 10~950 nm), therefore the polarization imaging lights P1 and P2 are superimposed. The first half-wave plate has a reflectivity close to the interlayer, therefore, the reflectivity at the juncture of the first half-wave plate and the interlayer is low. A part of the polarization imaging light S passing through the reflection sandwich layer 1 is a polarization imaging light S3, when passing through the juncture of the first half-wave plate and the interlayer, the polarization imaging light S3 will be converted into a polarization imaging light P3. At Brewster's angle, the reflectivity of the interlayer and the first glass for the polarization imaging light P3 is close to zero. The polarization imaging light P3 passes through the interlayer and the first glass via the first half-wave plate, which can solve the problem of low reflection at the Brewster's angle, the invisibility of the polarized sunglasses, raindrops-caused image distortion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 5:
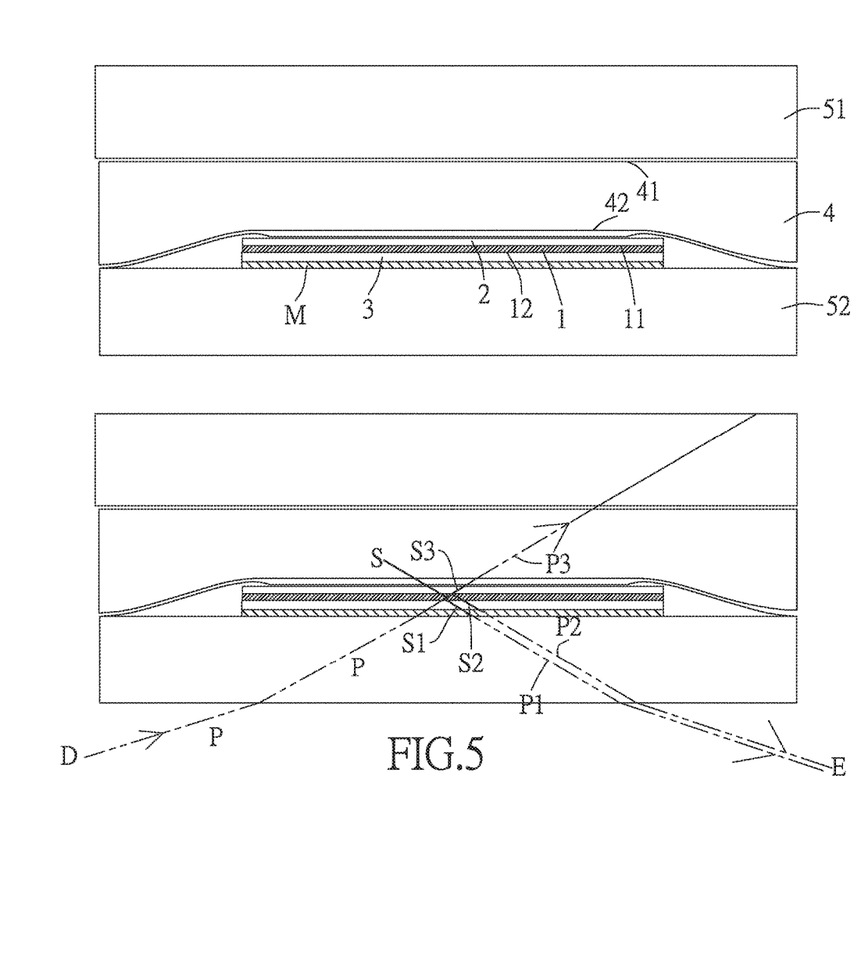
FIG. 5 is an illustrative view of an anti-ghosting reflection device in accordance with a first preferred embodiment of the present invention.

Referring to FIG. 5, an anti-ghosting reflection device in accordance with the first preferred embodiment of the present invention comprises: a reflection sandwich layer 1, a first half-wave plate 2 and a second half-wave plate 3.

The reflection sandwich layer 1 includes a first surface 11 and a second surface 12 which are used as reflection surfaces. The reflection sandwich layer 1 is a transparent medium consists of a high refractivity layer and a low refractivity layer, and the first and second surfaces 11, 12 which are abutted against each other can produce a relatively high reflectivity. For example, the reflection sandwich layer 1 can be transparent and includes a high refractivity layer which has a reflectivity higher than the half-wave plates 2 and 3. The high refractivity layer can be a titanium dioxide coating and other oxidation metal coating. Or, the reflection sandwich layer 1 can be transparent and includes a high refractivity layer which has a reflectivity lower than the half-wave plates, and the low refractive layer is air.

The first half-wave plate 2 is disposed on the first surface 11 of the reflection sandwich layer 1, and made of plastic material.

The second half-wave plate 3 is disposed on the second surface 12 and made of plastic material.

Figure 6:
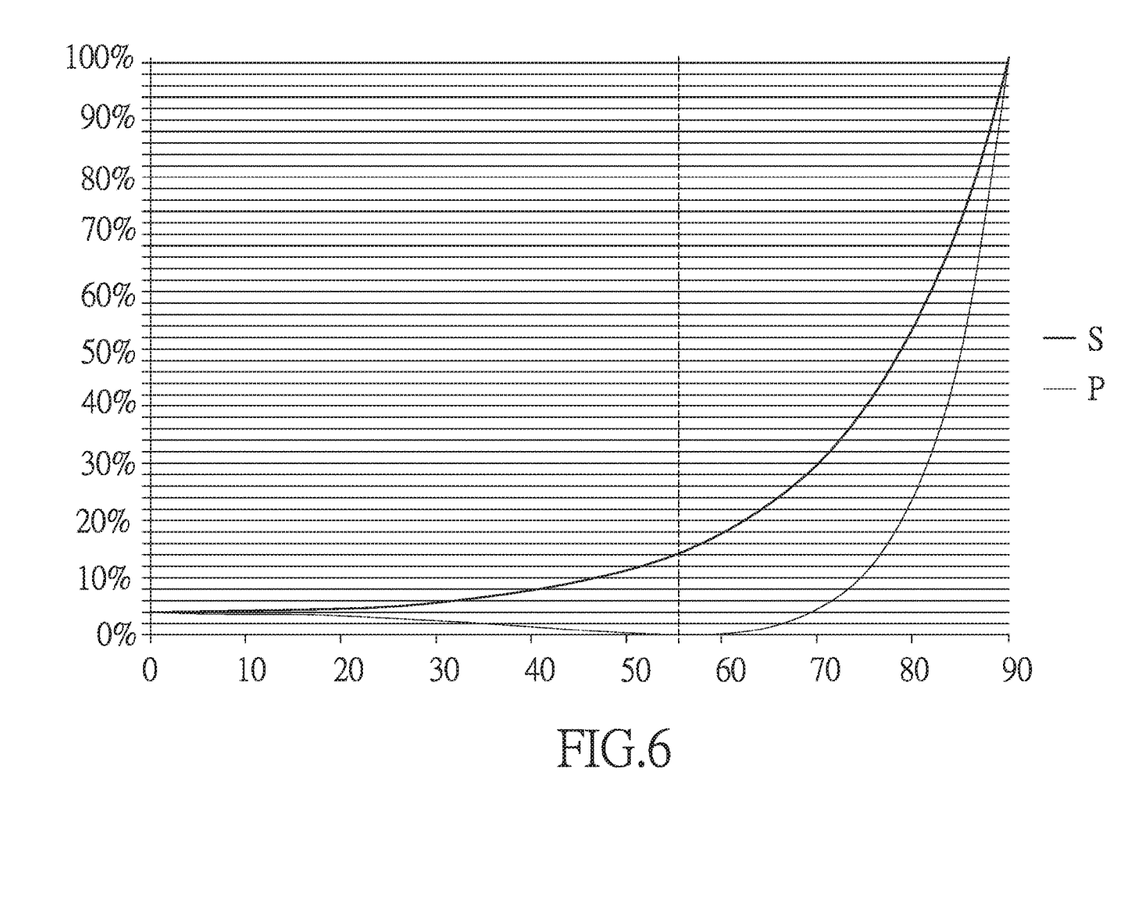
FIG. 6 is an illustrative of the present invention showing various reflectivities corresponding to different incident angles.

An anti-ghosting display system in accordance with the present invention includes the anti-ghosting reflection device which is disposed between a first glass 51 and a second glass 52. The first and second glasses 51, 52 can be the windshield of a vehicle. The bottom surface of the second half-wave plate 3 is coated with adhesive M to bond to the second glass 52. An interlayer 4 made of PVB (polyvinyl butyral) is disposed between a top surface of the first half-wave plate 2 and the first glass 51. An imaging device D produces a polarization imaging light P, as shown in FIG. 6, at Brewster's angle, the reflectivity of the second glass 52 for the polarization imaging light P is close to zero. The polarization imaging light P passes through the second glass 52, and when passing through the juncture of the second half-wave plate 3 and the second surface 12 of the reflection sandwich layer 1, the polarization imaging light P will be converted into the polarization imaging light S. The reflection of the polarization imaging light S by the second surface 12 is a polarization imaging light S1. When passing through the juncture of the second half-wave plate 3 and the second glass 52, the polarization imaging light S1 is converted into a polarization imaging light P1 which passes through the second glass 52 toward the direction of the user's eyes E. The reflection of the polarization imaging light S by the first surface 11 is a polarization imaging light S2, when passing through the juncture of the second half-wave plate 3 and the second glass 52, the polarization imaging light S2 will be converted into a polarization imaging light P2 which passes through the second glass 52 and toward the direction of the user's eyes E. The reflection sandwich layer 1 is very thin (approximately 10~950 nm), therefore the polarization imaging lights P1 and P2 are superimposed. The first half-wave plate 2 has a reflectivity close to the interlayer 4, therefore, the reflectivity at the juncture of the first half-wave plate 2 and the interlayer 4 is low. A part of the polarization imaging light S passing through the reflection sandwich layer 1 is a polarization imaging light S3, when passing through the juncture of the first half-wave plate 2 and the interlayer 4, the polarization imaging light S3 will be converted into a polarization imaging light P3. At Brewster's angle, the reflectivity of the interlayer 4 and the first glass 51 for the polarization imaging light P3 is close to zero. The polarization imaging light P3 passes through the interlayer 4 and the first glass 51 via the first half-wave plate 2, which can solve the problem of low reflection at the Brewster's angle, the invisibility of the polarized sunglasses, raindrops-caused image distortion.

Figure 7:
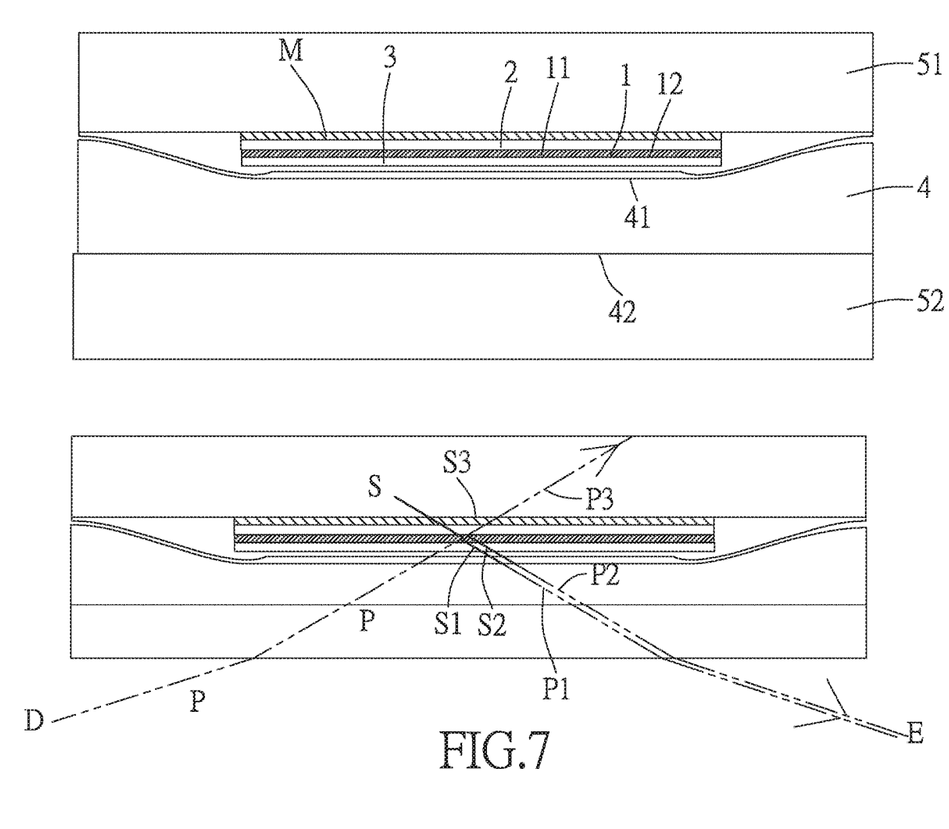
FIG. 7 is another illustrative view of the anti-ghosting reflection device in accordance with the first preferred embodiment of the present invention.
Figure 8:
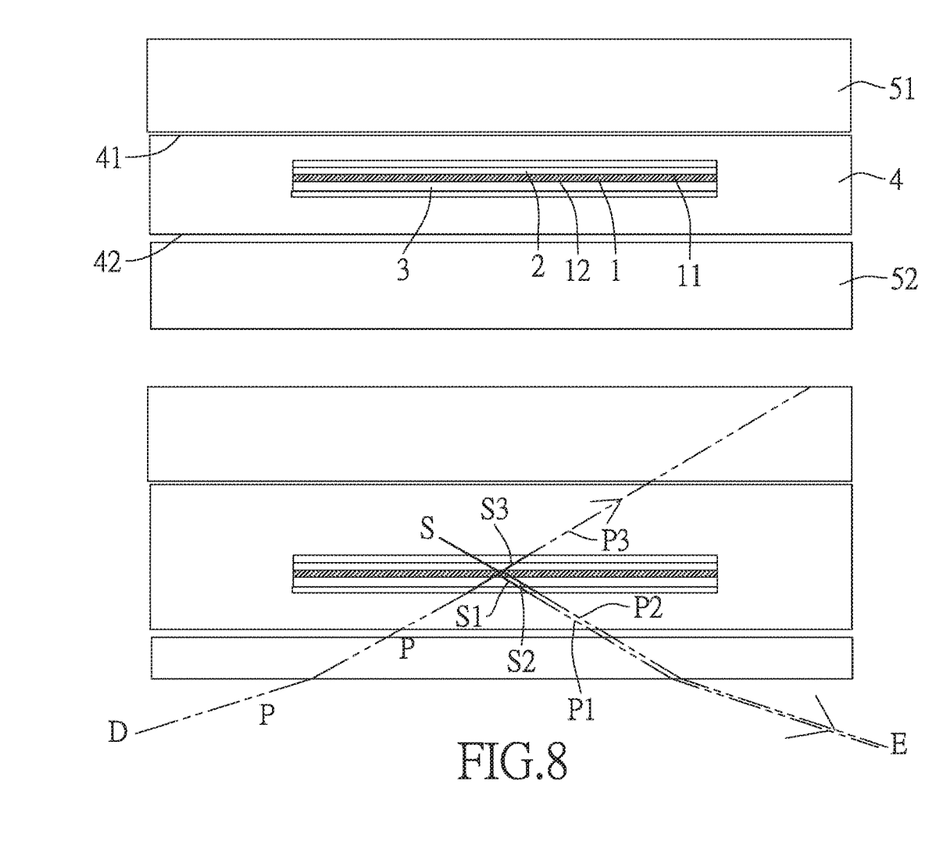
FIG. 8 is another illustrative view of the anti-ghosting reflection device in accordance with the first preferred embodiment of the present invention.

As shown in FIG. 7, the top surface of the first half-wave plate 2 can also be coated with the adhesive M to be bonded to the first glass 51. Or, as shown in FIG. 8, the anti-ghosting reflection device can be disposed in the interlayer 4, and the polarization imaging light P has a reflectivity close to zero because of the Brewster's angle, and the function of the imaging device D is the same as mentioned above.

Figure 9:
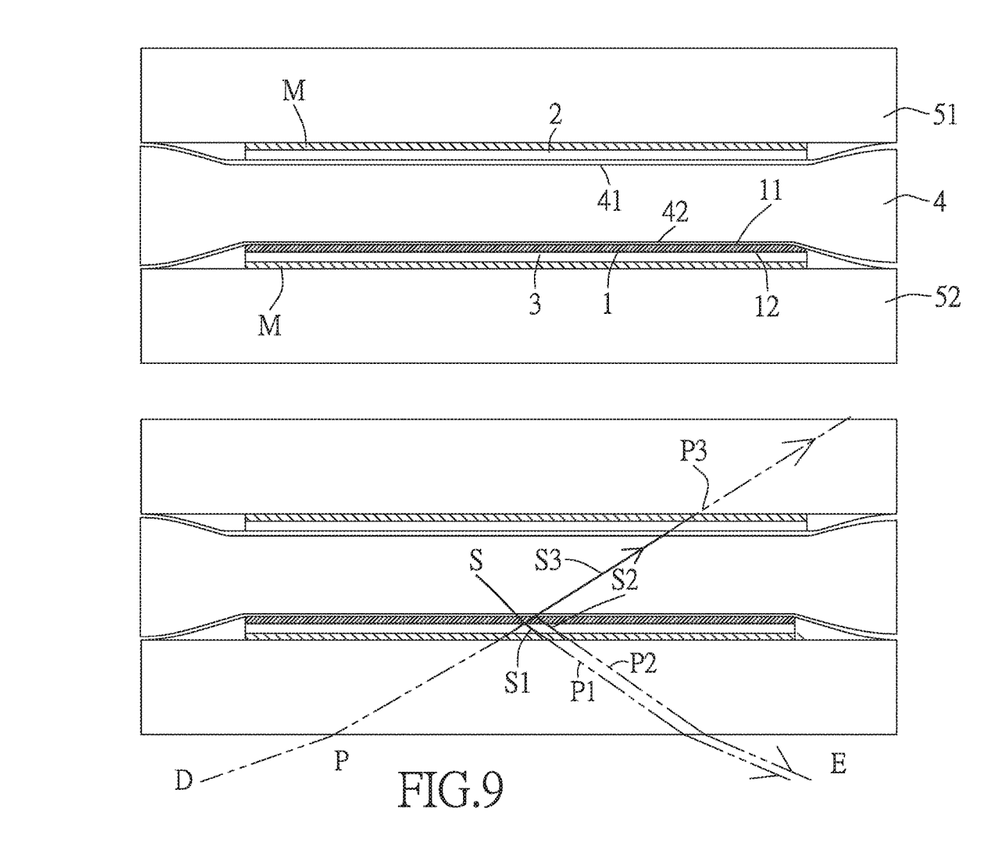
FIG. 9 is an illustrative view of an anti-ghosting reflection device in accordance with a second preferred embodiment of the present invention.

Referring to FIG. 9, an anti-ghosting reflection device in accordance with a second preferred embodiment of the present invention comprises: the reflection sandwich layer 1, the first half-wave plate 2, the second half-wave plate 3 and the interlayer 4.

The difference of this embodiment from the first embodiment is that the interlayer 4 of this embodiment is made of PVB (polyvinyl butyral) material and disposed between the first half-wave plate 2 and the reflection sandwich layer 1. The interlayer 4 includes a third surface 41 and a fourth surface 42. In this embodiment, the fourth surface 42 of the interlayer 4 is disposed on the first surface 11 of the reflection sandwich layer 1.

The anti-ghosting display system of this embodiment comprises the anti-ghosting reflection device and an imaging device D. The anti-ghosting reflection device is disposed between a first glass 51 and a second glass 52. The second half-wave plate 3 has its bottom surface coated with adhesive M to bond to the second glass 52, and the first half-wave plate 2 has its top surface coated with the adhesive M to bond to the first glass 51. An imaging device D produces a polarization imaging light P, as shown in FIG. 7, at Brewster's angle, the reflectivity of the second glass 52 for the polarization imaging light P is close to zero. The polarization imaging light P passes through the second glass 52, and when passing through the juncture of the second half-wave plate 3 and the second surface 12 of the reflection sandwich layer 1, the polarization imaging light P will be converted into the polarization imaging light S. The reflection of the polarization imaging light S by the second surface 12 is a polarization imaging light S1. When passing through the juncture of the second half-wave plate 3 and the second glass 52, the polarization imaging light 51 is converted into a polarization imaging light P1 which passes through the second glass 52 toward the direction of the user's eyes E. The reflection of the polarization imaging light S by the first surface 11 is a polarization imaging light S2, when passing through the juncture of the second half-wave plate 3 and the second glass 52, the polarization imaging light S2 will be converted into a polarization imaging light P2 which passes through the second glass 52 and toward the direction of the user's eyes E. The reflection sandwich layer 1 is very thin (approximately 10~950 nm), therefore the polarization imaging lights P1 and P2 are superimposed. A part of the polarization imaging light S passing through the reflection sandwich layer 1 is a polarization imaging light S3. The first half-wave plate 2 has a reflectivity close to the interlayer 4, therefore, the reflectivity at the juncture of the first half-wave plate 2 and the interlayer 4 is low. The reflection of interlayer 4 for the polarization imaging light S3 is close to zero, and the polarization imaging light S3 passes through the interlayer 4. When passing through the juncture of the first half-wave plate 2 and the first glass 51, the polarization imaging light S3 will be converted into a polarization imaging light P3. At Brewster's angle, the reflectivity of the first glass 51 for the polarization imaging light P3 is close to zero. The polarization imaging light P3 passes through the first glass 51 via the first half-wave plate 2, which can solve the problem of low reflection at the Brewster's angle, the invisibility of the polarized sunglasses, raindrops-caused image distortion.

Figure 10:
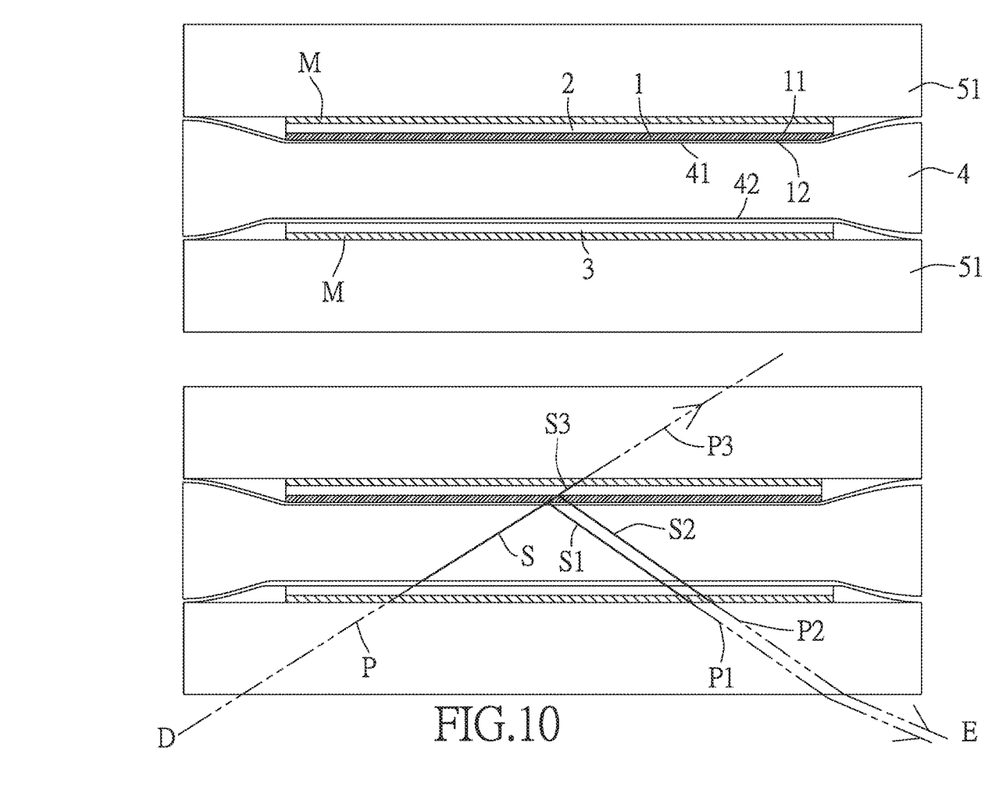
FIG. 10 is another illustrative view of the anti-ghosting reflection device in accordance with the second preferred embodiment of the present invention.

As shown in FIG. 10, the interlayer 4 can also be disposed between the second half-wave plate 3 and the reflection sandwich layer 1, and the third surface 42 of the interlayer 4 is disposed on beneath the second surface 12 of the reflection sandwich layer 1. The polarization imaging light P has a reflectivity close to zero because of the Brewster's angle, and the function of the imaging device D is the same as mentioned above.

In conclusion, the use of the reflection sandwich layer 1 in the two half-wave plates 2, 3 in combination with the polarization imaging light P can solve the problem of low reflection at the Brewster's angle, the invisibility of the polarized sunglasses, raindrops-caused image distortion.

While we have shown and described various embodiments in accordance with the present invention, it is clear to those skilled in the art that further embodiments may be made without departing from the scope of the present invention.

What is claimed is:

1. An anti-ghosting reflection device, comprising:
   a reflection sandwich layer with a first surface and a second surface which are used as reflection surfaces;
   a first half-wave plate disposed on the first surface of the reflection sandwich layer; and
   a second half-wave plate disposed on the second surface.

2. The anti-ghosting reflection device as claimed in claim 1, wherein the reflection sandwich layer is transparent and has a reflectivity higher than a reflectivity of the first and second half-wave plates.

3. The anti-ghosting reflection device as claimed in claim 1, wherein the reflection sandwich layer is transparent and has a reflectivity lower than a reflectivity of the first and second half-wave plates.

4. The anti-ghosting reflection device as claimed in claim 1 further comprising an interlayer disposed between the reflection sandwich layer and the first half-wave plate.

5. The anti-ghosting reflection device as claimed in claim 1 further comprising an interlayer disposed between the reflection sandwich layer and the second half-wave plate.

6. The anti-ghosting reflection device as claimed in claim 1, wherein the anti-ghosting reflection device is disposed in an interlayer.

7. An anti-ghosting display system, comprising:
   an anti-ghosting reflection device which comprises: a reflection sandwich layer with a first surface and a second surface which are used as reflection surfaces; a first half-wave plate disposed on the first surface of the reflection sandwich layer; a second half-wave plate disposed on the second surface; wherein the anti-ghosting reflection device is disposed between a first glass and a second glass, the first glass and the second glass are a windshield of a vehicle; and
   an imaging device produces a polarization imaging light P to pass through the second half-wave plate, the second surface of the reflection sandwich layer, the first surface of the reflection sandwich layer and the first half-wave plate, a juncture of the second half-wave plate and the second surface of the reflection sandwich layer serves to convert the polarization imaging light P into a polarization imaging light S, a reflection of the polarization imaging light S by the second surface is a polarization imaging light S1, a juncture of the second half-wave plate and the second glass serves to convert the polarization imaging light S1 into a polarization imaging light P1, the polarization imaging light P1 serves to pass through the second glass and toward the direction of a user's eyes, a reflection of the polarization imaging light S by the first surface of the reflection sandwich layer is a polarization imaging light S2, the juncture of the second half-wave plate and the second glass serves to convert the polarization imaging light S2 into a polarization imaging light P2, and the polarization imaging light P2 serves to pass through the second glass and toward the direction of the user's eyes.

8. The anti-ghosting display system as claimed in claim 7 further comprising an interlayer disposed between the reflection sandwich layer and the first half-wave plate.

9. The anti-ghosting display system as claimed in claim 7 further comprising an interlayer disposed between the reflection sandwich layer and the second half-wave plate.

10. The anti-ghosting display system as claimed in claim 7, wherein the anti-ghosting reflection device is disposed in an interlayer.

* * * * *